United States Patent
Dhale et al.

(10) Patent No.: US 11,658,468 B2
(45) Date of Patent: May 23, 2023

(54) SPLICE FOR CABLE TRAY BARRIER STRIP

(71) Applicant: Eaton Intelligent Power Limited, Dublin (IE)

(72) Inventors: Sayali Shridhar Dhale, Yavatmal (IN); Nicholas R. Grahek, Glen Carbon, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/127,723

(22) Filed: Dec. 18, 2020

(65) Prior Publication Data
US 2021/0194228 A1    Jun. 24, 2021

Related U.S. Application Data

(60) Provisional application No. 62/950,723, filed on Dec. 19, 2019.

(51) Int. Cl.
*F16L 3/00*    (2006.01)
*H02G 3/04*   (2006.01)
*H02G 3/00*   (2006.01)

(52) U.S. Cl.
CPC ......... *H02G 3/0456* (2013.01); *H02G 3/0406* (2013.01); *H02G 3/263* (2013.01)

(58) Field of Classification Search
None
See application file for complete search history.

(56) References Cited

U.S. PATENT DOCUMENTS

| | | | | |
|---|---|---|---|---|
| 5,638,477 A * | 6/1997 | Patterson | ............. | G02B 6/3802 385/99 |
| 6,061,884 A * | 5/2000 | Ohms | ................. | H02G 3/0443 24/545 |
| 6,173,848 B1 * | 1/2001 | Bravo | .................. | H05K 7/1425 211/187 |
| 8,523,119 B1 * | 9/2013 | Greer | .................... | E03D 11/143 248/65 |
| 9,293,899 B2 * | 3/2016 | Rouleau | ............... | H02G 3/0608 |

(Continued)

OTHER PUBLICATIONS

Anonymous, "User Guide User Guide for Bolts: Recommended Torque Edge Protection Intended Use SPB—Protection Equipment," Aug. 10, 2018, https/:/www.oglaend-system.com/getfile.ph/1366178-1614762735/Produkter/Dokumenter%20(public)/0I-RD-UG-EN-0051.pdt [retrieved on Mar. 16, 2021], XP055786319.

(Continued)

*Primary Examiner* — Steven M Marsh
(74) *Attorney, Agent, or Firm* — Stinson LLP

(57) ABSTRACT

A splice couples together abutting barrier strips for a cable tray. The splice generally includes a base wall. Opposing sidewalls extend outward from opposite sides of the base wall. The opposing side walls and the base wall together define an open interior of the splice configured to receive the abutting barrier strips therein. A window may extend through the base wall to the open interior to allow the abutting barrier strips to be visible therethrough when the abutting barrier strips are received in the open interior of the splice. A grip may be on the opposing side walls to enhance gripping of the splice. At least one of the sidewalls may have a chamfered corner to enhance entry of the barrier strips into the open interior.

18 Claims, 14 Drawing Sheets

(56) References Cited

U.S. PATENT DOCUMENTS

| 9,869,331 B2* | 1/2018 | Muntasser ................ F16L 1/00 |
| 10,935,060 B2* | 3/2021 | Shelton ................ H02G 3/0608 |
| 11,121,531 B2* | 9/2021 | Cretella ............... H02G 3/0608 |
| 2015/0078809 A1* | 3/2015 | Winn ................... H02G 3/0608 |
| | | 403/188 |
| 2018/0076605 A1 | 3/2018 | Garcia |
| 2019/0089141 A1 | 3/2019 | Combes et al. |

OTHER PUBLICATIONS

"Steel Cable Ladder Cable Support Systems CTCSL-10", Dec. 31, 2010, http://www1.cooperbline.com/pdf/catalogs/CTSCL-10.pdt, [retrieved on Nov, 11, 2015], XP055227764.

International Search Report and Written Opinion issued in PCT/EP2020/025590, dated Mar. 24, 2021, 13 pages.

* cited by examiner

SPLICE FOR CABLE TRAY BARRIER STRIP

FIELD OF THE DISCLOSURE

The present disclosure generally relates to a splice for a cable tray barrier strip.

BACKGROUND OF THE DISCLOSURE

Abutting barrier strips may be used to divide a cable tray into one or more longitudinal sections, such as for separating different types of cable, wires, fibers, or other components running along and within the cable tray. A splice may be used to splice or couple together the abutting barrier strips.

SUMMARY OF THE DISCLOSURE

In one aspect, a splice for coupling together abutting barrier strips for a cable tray generally comprises a base wall. Opposing sidewalls extend outward from opposite sides of the base wall. The opposing side walls and the base wall together define an open interior of the splice configured to receive the abutting barrier strips therein. A window extends through the base wall to the open interior. The window is configured to allow the abutting barrier strips to be visible therethrough when the abutting barrier strips are received in the open interior of the splice.

In another aspect, a splice for coupling together abutting barrier strips for a cable tray generally comprises a base wall. Opposing sidewalls extend outward from opposite sides of the base wall. The opposing side walls and the base wall together define an open interior of the splice configured to receive the abutting barrier strips therein. A grip is on the opposing side walls and is configured to enhance gripping of the splice.

In yet another aspect, a splice for coupling together abutting barrier strips for a cable tray generally comprises a base wall. Opposing sidewalls extend outward from opposite sides of the base wall. The opposing side walls and the base wall together define an open interior of the splice configured to receive the abutting barrier strips therein. At least one of the sidewalls has a chamfered corner to enhance entry of the barrier strips into the open interior.

BRIEF DESCRIPTION OF THE DRAWINGS

Corresponding reference characters indicate corresponding parts throughout the drawings.

DETAILED DESCRIPTION OF THE DISCLOSURE

Figure 1:
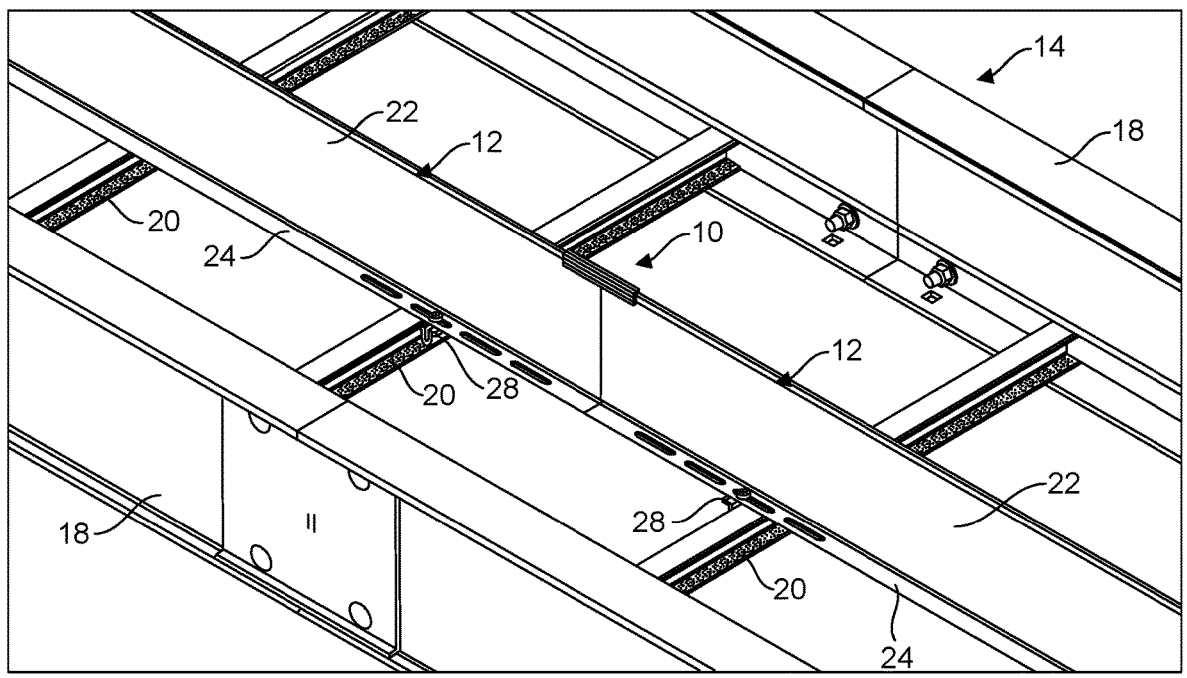
FIG. 1 is a partial perspective of a cable tray assembly including a cable tray, barrier strips, and a splice for the barrier strips.
Figure 2:
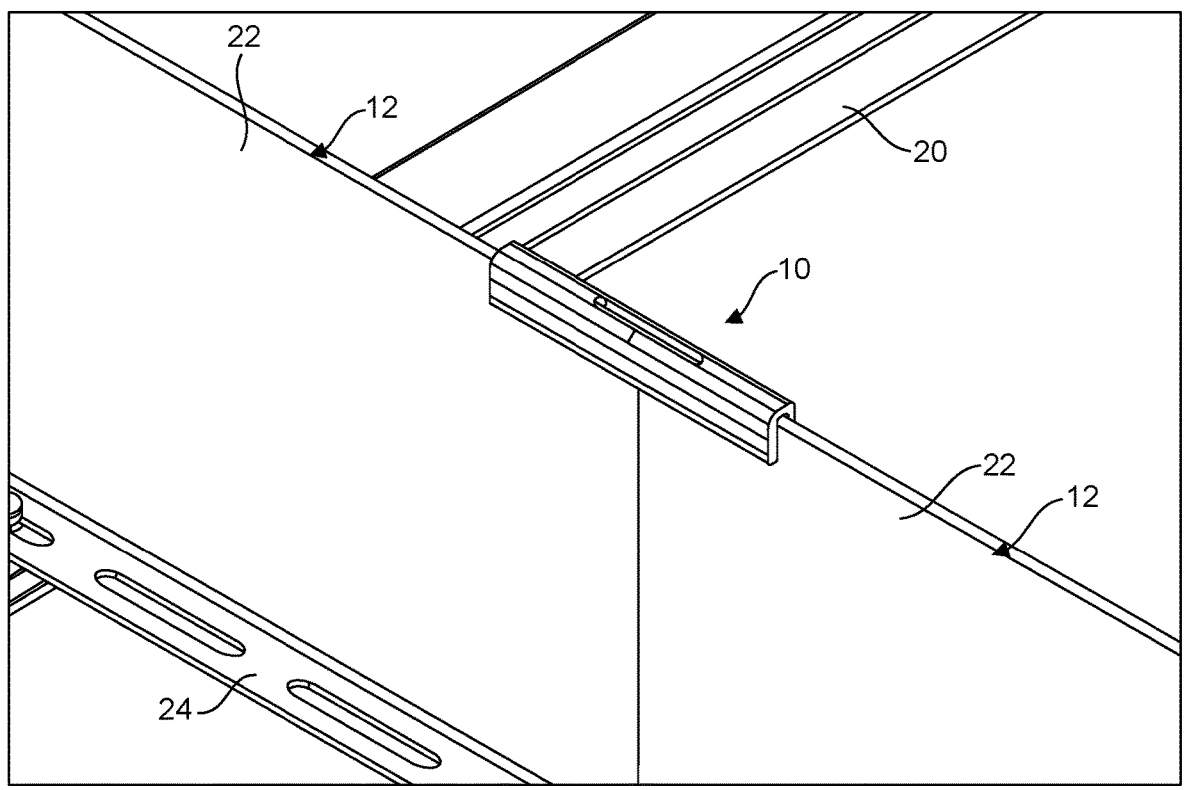
FIG. 2 is an enlarged view of FIG. 1.
Figure 3:
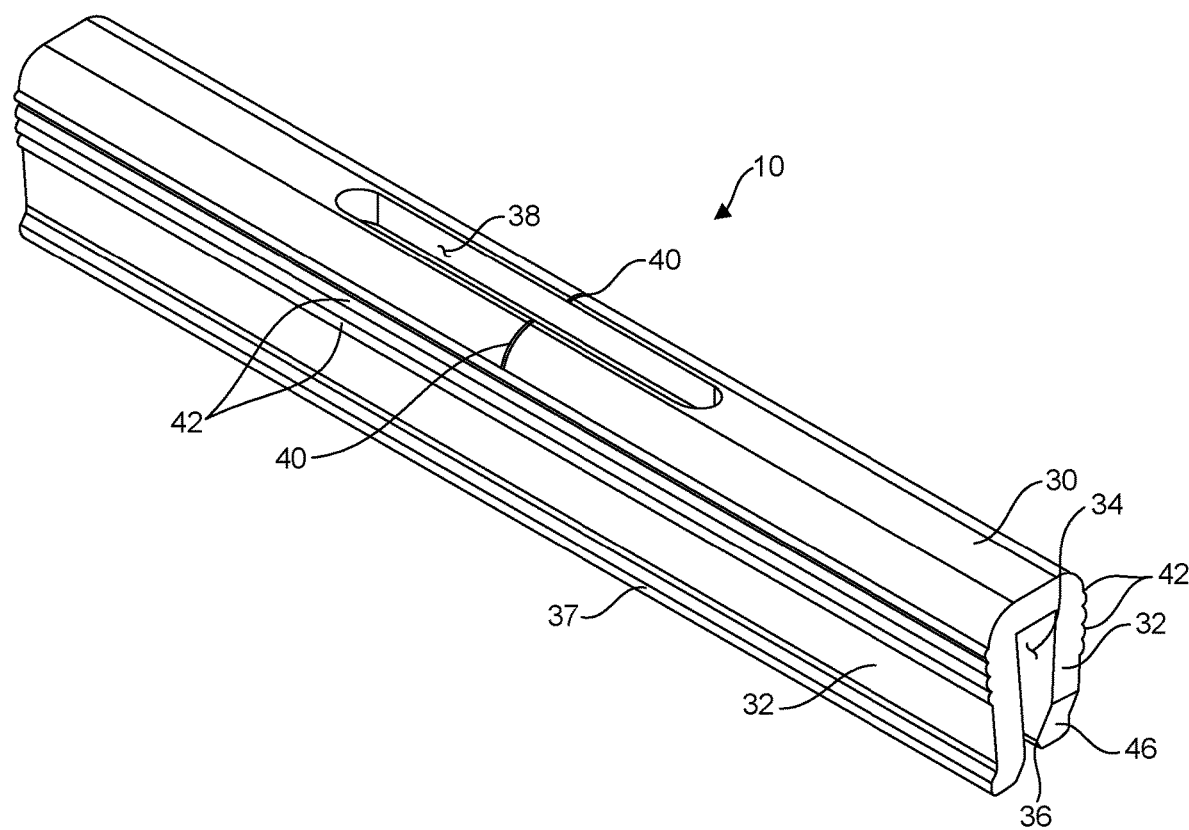
FIG. 3 is a perspective of the splice.
Figure 4:
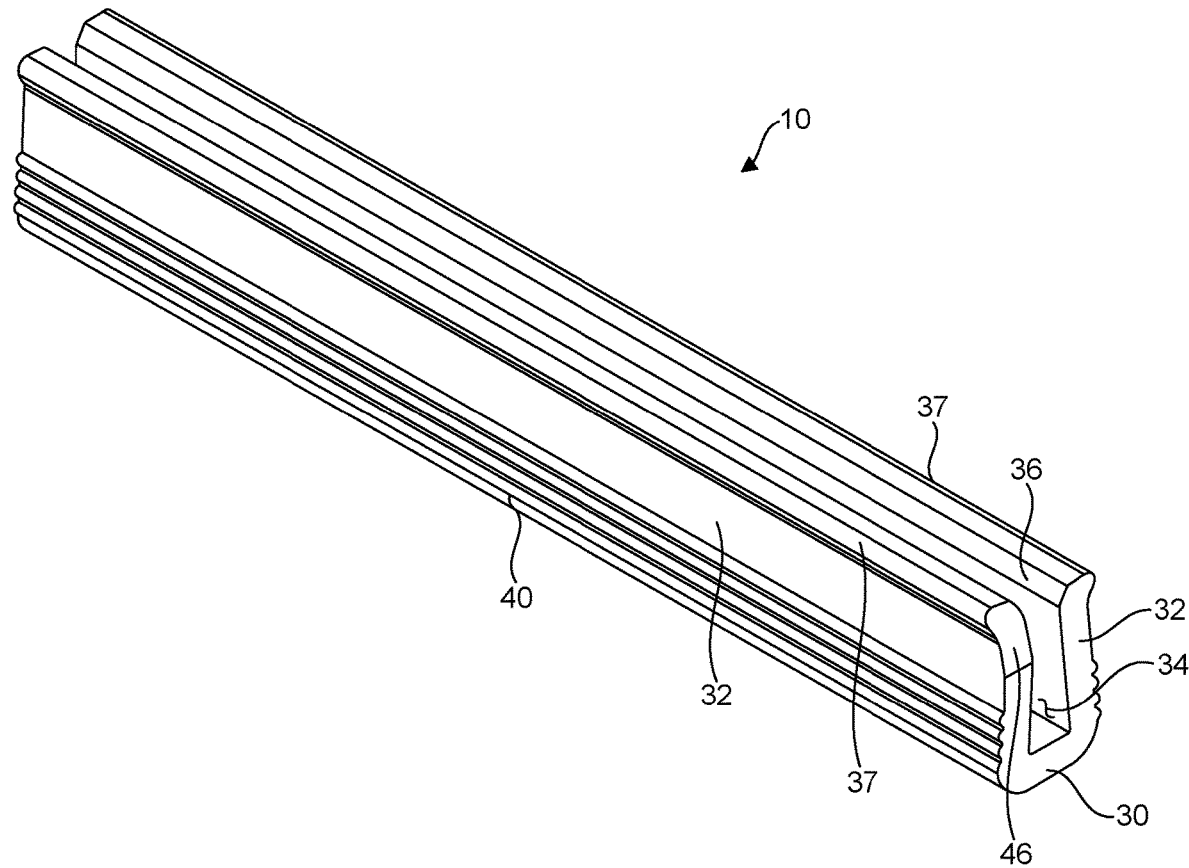
FIG. 4 is a bottom perspective of the splice.
Figure 5:
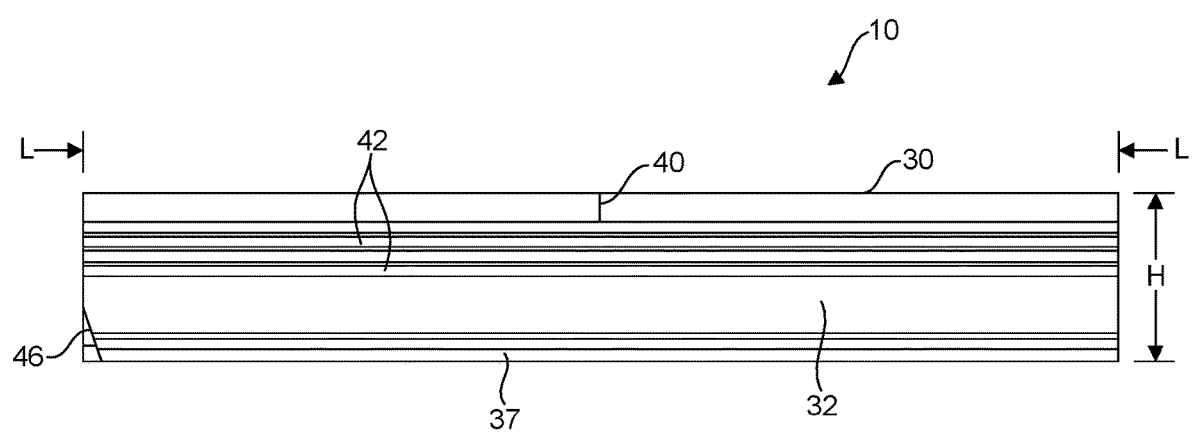
FIG. 5 is a rear elevation of the splice.

Referring to FIGS. 1 and 2, an illustrated embodiment of a splice for a cable tray barrier strip is generally indicated at reference numeral 10. As shown in FIGS. 1 and 2, and explained in more detail below, the splice 10 is configured to join or splice together abutting cable tray barrier strips, generally indicated at 12, secured within a cable tray, generally indicated at 14. The splice 10 also functions to align the abutting barrier strips 12 and cover the edges of the barrier strips to inhibit cable, wires, fibers, etc. from being damaged by the edges.

As is generally known in the art, the barrier strips 12 divide the cable tray 14 into one or more longitudinal sections, such as for separating different types of cable, wires, fibers, or other components running along and within the cable tray. In the illustrated embodiment, as shown in FIG. 1, the cable tray 14 is of the type including opposing side rails 18 running a length of the cable tray, and rungs 20 secured to the rails and extending transverse or crosswise to the length of the cable tray. The cable tray may have other designs and/or configurations. The illustrated barrier strips 12 are generally L-shaped in cross section having an upstanding wall 22 extending from a base 24. The base 24 is configured to be secured to one or more of the rungs 20 of the cable tray 14, such as by inserting one or more fasteners through openings in the base and into one or more clips 28 coupled to respective one or more rung(s). The barrier strips 12 may have other designs and/or configurations. The cable tray 14 and the barrier strips 12 may be manufactured from metal, such as steel or aluminum, or other material. Together, the splice 10, the cable tray 14, and the barrier strips 12 may form at least a part of a cable tray assembly.

Figure 6:
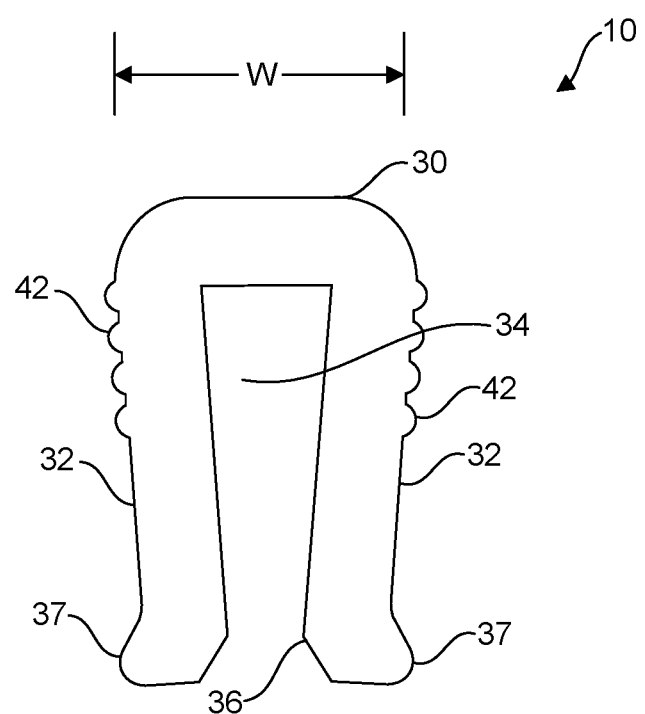
FIG. 6 is a right elevation of the splice.
Figure 7:
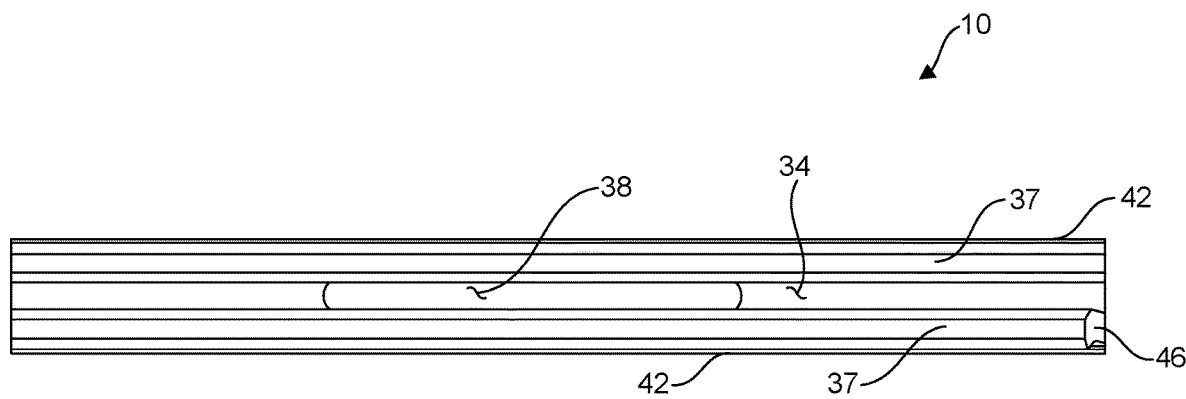
FIG. 7 is a bottom plan of the splice.
Figure 8:
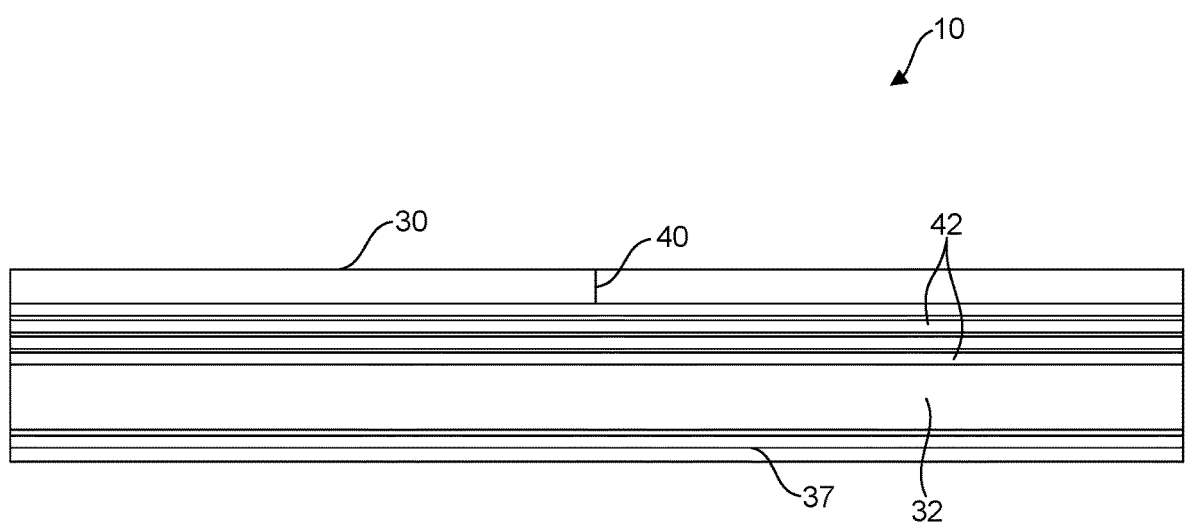
FIG. 8 is a front elevation of the splice.
Figure 9:
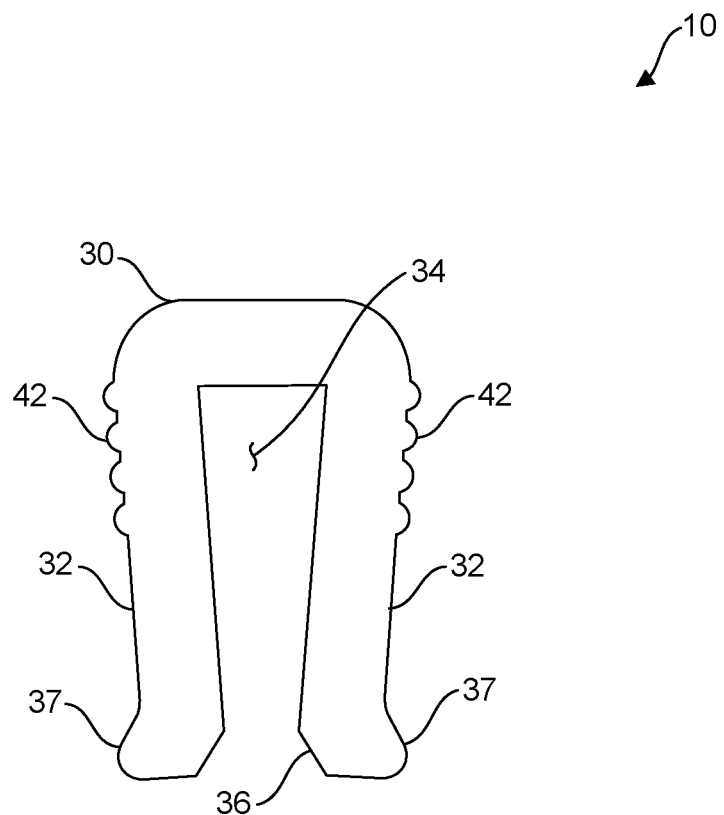
FIG. 9 is a left elevation of the splice.
Figure 10:
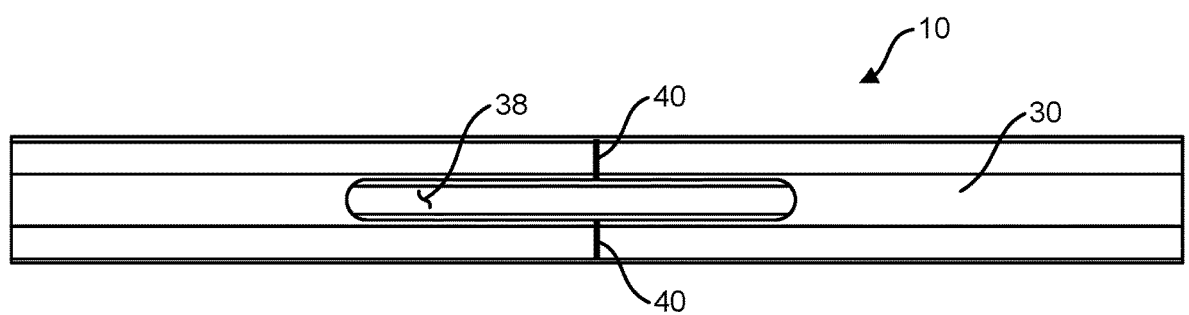
FIG. 10 is a top plan of the splice.

Referring to FIGS. 3-10, the splice 10 is generally channel-shaped (or U-shaped in cross section) having a length L (FIG. 5) extending between opposite ends and a width W (FIG. 6) extending between opposite sides. The splice 10 includes a base wall 30 and two opposing sidewalls 32 extending outward from opposite sides of the base wall, together defining an open interior 34 of the splice. Free end portions of the sidewalls 32 define a throat 36 of the open interior 34 therebetween. As shown in FIGS. 6 and 9, in the initial configuration, the sidewalls 32 are angled slightly toward one another from the base wall 30 so that the throat 36 has a width less than the width of the open interior 34 adjacent the base wall. The throat 36 flares outward toward the free ends of the sidewalls 32 to define an enlarged portion to facilitate insertion of the upstanding walls 22 into the open interior 34 of the splice 10. The exterior of each of the free end portions of the side walls 32 may also flare outward to define elongate feet 37 extending along the length L. The illustrated splice 10 is configured to function as a clip, whereby the sidewalls 32 are deflectable (e.g., resiliently deflectable, such as resiliently deflectable from the base wall 30) outward away from one another when inserting upper end portions of the upstanding walls 22 of the barrier strips 12 at the abutment or juncture of the strips into the open interior 34 of the splice through the throat 36. In the illustrated embodiment, the splice 10 is integrally formed as a one-piece, monolithic component.

In the illustrated embodiment, at least a portion of an exterior surface of the base wall 30 is generally planar or flat along its length. An interior surface of the base wall 30 may also be planar or flat. A window 38 extends through the base wall 30 (e.g., through the planar portion of the base wall) to the open interior so that the upper end portions of the upstanding walls 22 of the barrier strips 12 are visible through the window when the splice 10 is received on the barrier strips. It is envisioned that the user would use the window 38 to confirm that the juncture or abutment of the barrier strips 12 are visible through the window, such as generally at a mid-length of the splice 10, to confirm that the splice is properly received on the barrier strips. The illustrated window 38 is elongate having a length extending along the length L of the splice 10. Indicia marking 40 may be disposed on the base wall 30 adjacent the window 38 to indicate the mid-length of the splice, such that the user may align the abutment or juncture of the barrier strips 12 with the indicia marking. As an example, the indicia marking 40 may be one or more lines, such as illustrated, which may be defined by a rib or a groove. Other indicia marking(s), such as arrows, other symbols, or words are within the scope of the present disclosure.

The sidewalls 32 of the splice 10 include grips 42 to enhance gripping of the splice 10, such as when installing the splice on the barrier strips 12. In the illustrated embodiment, the grips 42 include one or more ribs or other protrusions having lengths extending along the length L of the splice. The illustrated ribs 42 are generally adjacent the base wall 30, although they may be at other locations, and may be spaced apart from one another along a height H (FIG. 5) of the splice 10. The illustrated ribs 42 extending the full length of the splice 10, although the ribs may extend less than the full length. The grips 42 may be of other designs, including knurls, bumps, ledges, grooves, openings, dents, or other structures for enhancing grip.

Figure 11:
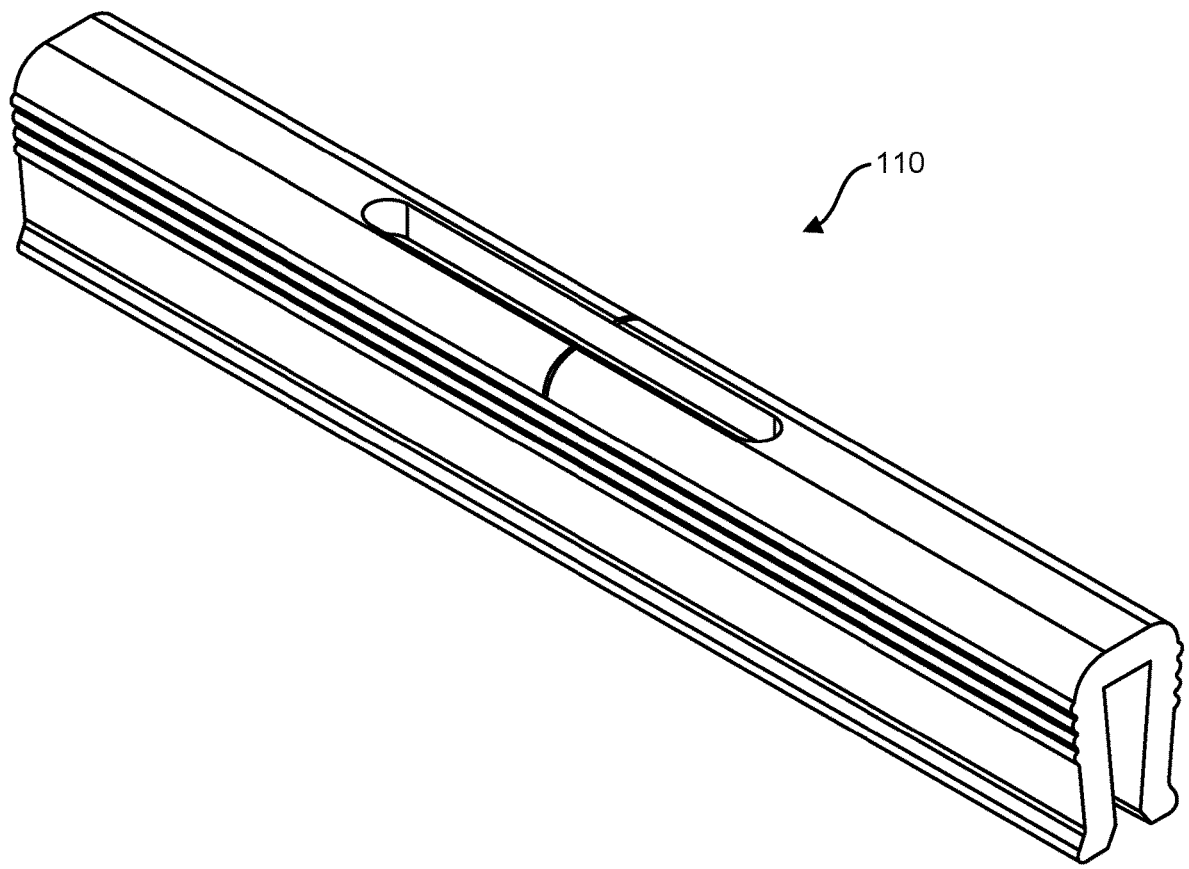
FIG. 11 is a perspective of another embodiment of a splice for the barrier strips.

To further facilitate installment of the splice 10, one or more corners of one or more of the sidewalls 32 at the free ends thereof is a chamfered (or beveled) corner 46. In the illustrated embodiment, one of the corners of one the sidewalls 32 is the chamfered corner 46. In this way, the splice 10 can be easily installed on the barrier strips 12 by passing the chamfered corners 46 over the barrier strip(s) 12 so that the strips enter the interior of the splice. In one or more other embodiments, one of the corners of each of the sidewalls 32 may be chamfered corners. In yet another embodiment, such as shown in FIG. 11, a splice 110 may be free of chamfered corners. In this embodiment, the splice 110 is identical to the splice 10 other than being free of chamfered corners, and therefore, the relevant teachings set forth above with respect to the splice 10 applies equally to the splice 110.

Figure 12:
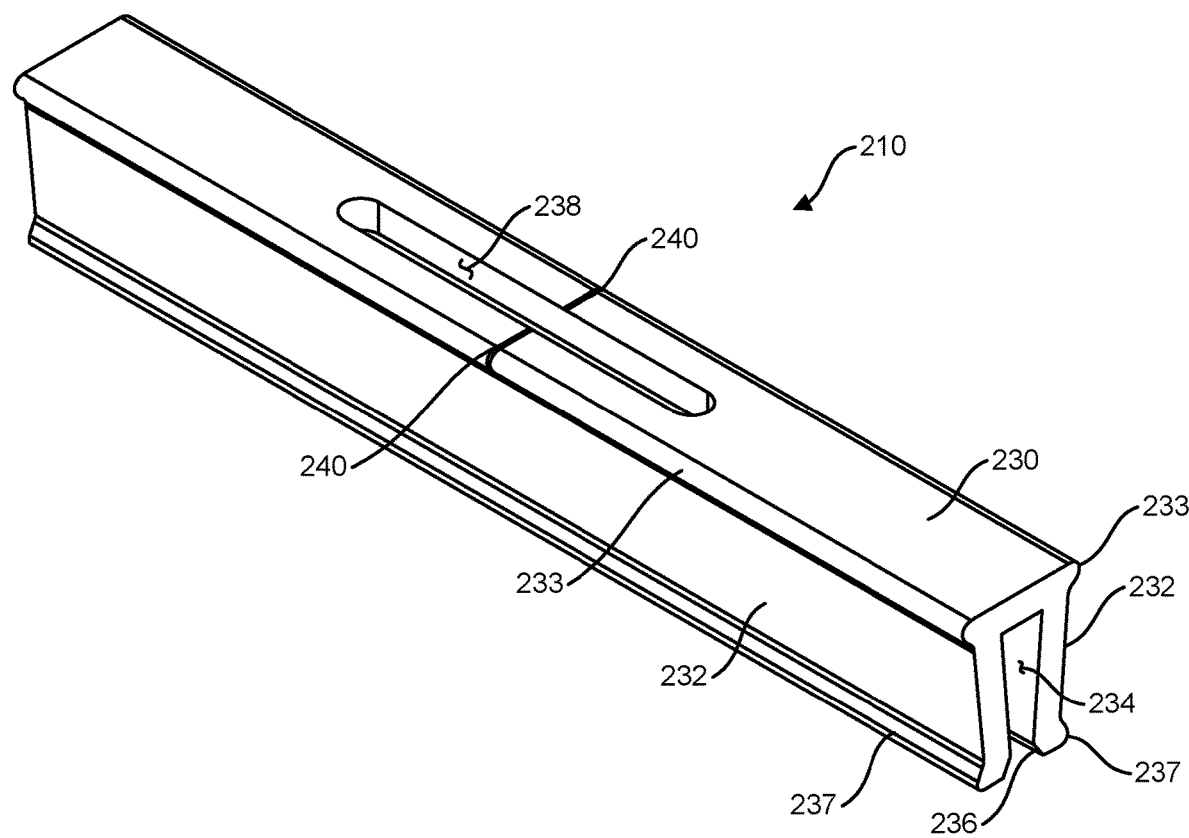
FIG. 12 is a perspective of yet another embodiment of a splice for the barrier strips.
Figure 13:
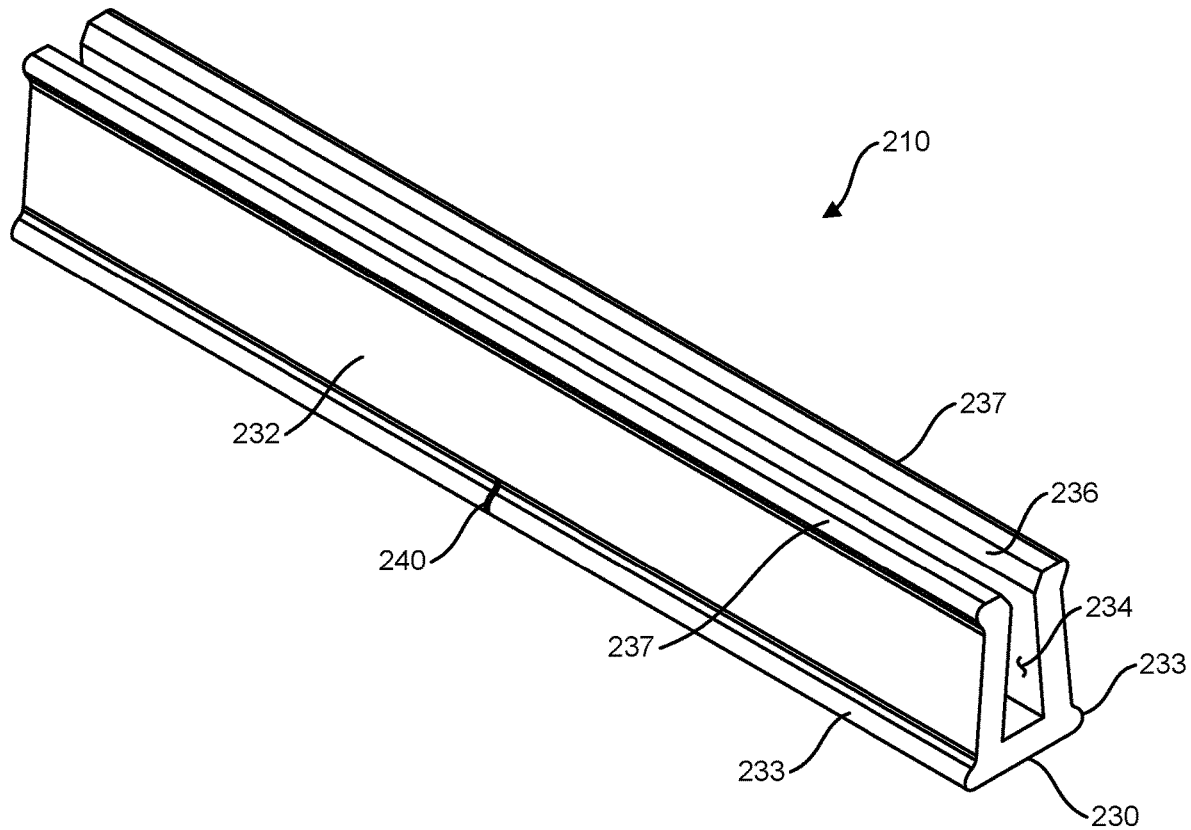
FIG. 13 is a bottom perspective of the splice of FIG. 12.
Figure 14:
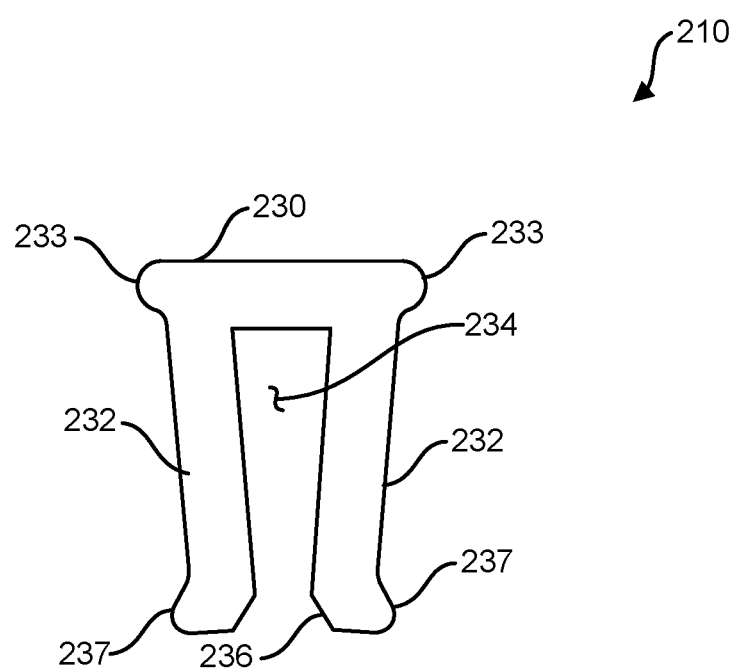
FIG. 14 is a right elevation of the splice of FIG. 12.

Referring to FIGS. 12-14, another embodiment of a splice for a cable tray barrier strip is generally indicated at reference numeral 210. This embodiment is similar to the previous embodiment, with the following differences being described hereinafter. The present splice 210 does not include the ribs on the opposing sidewalls 232, or the chamfered corners. Moreover, the present splice 210 includes protruding ribs 233 at the opposite junctions of the flat or planar base wall 230 and the sidewalls 232 extending along the length of the splice. Like the prior embodiment, the present splice 210 also includes the open interior 234, the throat 236, the feet 237, the window 238, and the indicia marking 240 on the base wall 230 adjacent the window to indicate the mid-length of the splice. Other configurations are possible.

Having described embodiments of the invention in detail, it will be apparent that modifications and variations are possible without departing from the scope of the invention defined in the appended claims.

When introducing elements of the present invention or embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray system comprising:
a cable tray having a length;
a pair of abutting barrier strips defining a juncture therebetween and extending along and within the cable tray; and
a splice coupled to the pair of abutting barrier strips and spanning the juncture of the pair of abutting barrier strips, the splice comprising
a base wall,
opposing sidewalls extending outward from opposite sides of the base wall, wherein the opposing side walls and the base wall together define an open interior of the splice in which the abutting barrier strips are received, and
a window extending through the base wall to the open interior, wherein the pair of abutting barrier strips are visible through the window.

2. The splice set forth in claim 1, wherein a mid-length of the splice passes through the window.

3. The splice set forth in claim 2, wherein the window is elongate having a length extending along a length of the splice.

4. The splice set forth in claim 3, further comprising an indicia marking adjacent the window configured to align a juncture of the abutting barrier strips with the indicia marking within the window.

5. The splice set forth in claim 4, wherein the indicia marking is at the mid-length of the splice.

6. The splice set forth in claim 5, wherein the indicia marking includes a line.

7. The splice set forth in claim 5, wherein the indicia marking includes indicia marking on either side of the window.

8. The splice set forth in claim 1, further comprising an indicia marking adjacent the window configured to align a juncture of the abutting barrier strips with the indicia marking within the window.

9. The splice set forth in claim 8, wherein the indicia marking is at mid-length of the splice.

10. The splice set forth in claim 1, further comprising a grip on the opposing side walls and configured to enhance gripping of the splice.

11. The splice set forth in claim 10, wherein the grip includes protrusions projecting from the side walls.

12. The splice set forth in claim 11, wherein the protrusions comprise ribs.

13. The splice set forth in claim 12, wherein the ribs extend along a length of the splice.

14. The splice set forth in claim 10, wherein at least one of the sidewalls has a chamfered corner to enhance entry of the barrier strips into the open interior.

15. The splice set forth in claim 1, wherein at least one of the sidewalls has a chamfered corner to enhance entry of the barrier strips into the open interior.

16. The splice set forth in claim 15, wherein one of the corners of each of the sidewalls is chamfered.

17. A method of assembling a cable tray system, the method comprising:
- coupling a pair of barrier strips to and within a cable tray having a length so that the barrier strips i) extend along and within the cable tray, ii) are abutting, and iii) define a juncture therebetween; and
- coupling a splice to the pair of abutting barrier strips so that i) the pair of barrier strips are received within an open interior of the splice, wherein the splice comprises a base wall and side walls defining the open interior, and ii) the juncture of the pair of barrier strips is visible through a window defined by the base wall.

18. The method of claim 17, wherein further comprising aligning an indicia marking on the splice with the juncture of the pair of barrier strips.

* * * * *